United States Patent
Lim

(10) Patent No.: US 7,925,113 B2
(45) Date of Patent: Apr. 12, 2011

(54) GENERATING COMPOUND IMAGES HAVING INCREASED SHARPNESS AND REDUCED NOISE

(75) Inventor: Suk Hwan Lim, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1019 days.

(21) Appl. No.: 11/740,976

(22) Filed: Apr. 27, 2007

(65) Prior Publication Data
US 2008/0267530 A1    Oct. 30, 2008

(51) Int. Cl.
*G06K 9/36* (2006.01)
(52) U.S. Cl. ................. 382/284; 701/17; 701/195
(58) Field of Classification Search .......... 345/615; 382/221, 264, 284; 702/17, 191, 194, 195
See application file for complete search history.

(56) References Cited

U.S. PATENT DOCUMENTS

| | | | |
|---|---|---|---|
| 6,310,982 B1 * | 10/2001 | Allred et al. | 382/260 |
| 6,778,210 B1 | 8/2004 | Sugahara et al. | |
| 7,009,636 B2 | 3/2006 | Liu et al. | |
| 7,061,524 B2 | 6/2006 | Liu et al. | |
| 7,437,018 B1 * | 10/2008 | Amirghodsi | 382/293 |
| 2003/0151689 A1 | 8/2003 | Murphy | |
| 2006/0187308 A1 | 8/2006 | Lim et al. | |
| 2007/0058780 A1 * | 3/2007 | Lienard et al. | 378/98.2 |

OTHER PUBLICATIONS

David X.D. Yang et al., "A 640×512 CMOS Image Sensor with Ultra Wide Dynamic Range Floating-Point Pixel-Level ADC," ISL, Stanford Univ., Session #17 (1998).
C. Tomasi et al., "Bilateral Filtering for Gray and Color Images," Proc. the 1998 IEEE Int'l Conf. Comp. Vis., Bombay, India (1998).
Xinqiao Liu et al., "Simultaneous Image Formation and Motion Blur Restoration via Multiple Capture," Proc. Int. Conf. Acoustics, Speech, Signal Processing, 2001.

* cited by examiner

*Primary Examiner* — Gregory F Cunningham

(57) ABSTRACT

Systems and method of generating compound images having increased sharpness and reduced noise are described. In one aspect, a comparison image signal is determined. The comparison image signal includes pixels with values respectively indexing values of pixels of a first image signal in relation to values of spatially corresponding pixels of a second image signal. The comparison image signal is filtered with a spatial filter. A compound image signal is generated. The compound image signal has pixels with values composed of contributions from the pixel values of the first image signal and the pixel values of the second image signal. The contributions are functions of respective values of spatially corresponding pixels in the filtered comparison image signal in relation to values of noise variation in the filtered comparison image signal.

20 Claims, 6 Drawing Sheets

GENERATING COMPOUND IMAGES HAVING INCREASED SHARPNESS AND REDUCED NOISE

CROSS-REFERENCE TO RELATED APPLICATIONS

This application relates to the following copending applications, each of which is incorporated herein by reference: U.S. application Ser. No. 11/064,128, filed Feb. 23, 2005; and U.S. application Ser. No. 11,388,152, filed Mar. 22, 2006.

BACKGROUND

In general, there is a trade-off between shorter exposure images and longer exposure images. A short exposure image typically is sharp because there is little motion blur, but such an image typically is noisy because the shorter exposure time typically results in underexposed pixels that produce image signals with low signal-to-noise-ratios. A long exposure image, on the other hand, typically is well exposed and therefore less noisy, but such an image typically is blurry because of motion that commonly occurs during the longer exposure period.

Some image enhancement approaches have been proposed for increasing the dynamic range (i.e., the ratio between the brightest and darkest parts of the scene) of an image by combining images of the same scene that were acquired at different exposure levels to produce a final image having a higher dynamic range than the constituent images. In these approaches, the pixel values in the final image typically are determined from a weighted average of the values of the corresponding pixels of the constituent images. In one dynamic range enhancement approach, an image that is characterized by high dynamic range, high signal-to-noise ratio, and reduced motion blur reportedly is produced by a recursive pixel-wise combination of pixel values obtained from a series of unfiltered multiple exposure images. In accordance with this approach, the pixel values of successive ones of the multiple exposure images are accumulated at each pixel location until either motion is detected between successive ones of the images or saturation of the image sensor is detected.

What are needed are improved systems and methods of generating images having increased sharpness and reduced noise.

SUMMARY

The invention features systems and methods of generating images having increased sharpness and reduced noise.

In one aspect, the invention features a method in accordance with which a comparison image signal is determined. The comparison image signal includes pixels with values respectively indexing values of pixels of a first image signal in relation to values of spatially corresponding pixels of a second image signal. The comparison image signal is filtered with a spatial filter. A compound image signal is generated. The compound image signal has pixels with values composed of contributions from the pixel values of the first image signal and the pixel values of the second image signal. The contributions are functions of respective values of spatially corresponding pixels in the filtered comparison image signal in relation to values of noise variation in the filtered comparison image signal.

The invention also features a system and a machine readable medium storing machine-readable instructions causing a machine to implement the method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below are capable of generating images having increased sharpness and reduced noise. In particular, these embodiments are operable to process image signals captured with different exposure time parameters into a compound image signal that is higher in sharpness and lower in noise than the constituent image signals. These embodiments include spatial filtering elements to assist in the generation of the compound image signal in a way that is robust to noise in the shorter exposure image signal and blur in the longer exposure image signal. As a result, the compound image signal is less likely to contain artifacts induced by noise and blur.

As used herein, the term "image signal" refers to a detectable physical quantity or impulse (e.g., electrical voltage or electrical current) that conveys information representing one or more components of an image. In some cases, an image signal conveys data values that describe the location and intensity of one or more pixels of an image. Some image signals correspond to raw or minimally processed readout signals obtained from an image sensor. Other image signals correspond to pixel data obtained from an image file stored on a machine-readable medium.

The term "noise variation" means the degree to which noise values tend to spread about an average noise value. The term "noise variation" encompasses any type of measure of the variation (or dispersion) in noise values, including but not limited to variance, standard deviation, range, mean deviation, semi-interquartile range, and 10-90 percentile range.

II. Overview

Figure 1:
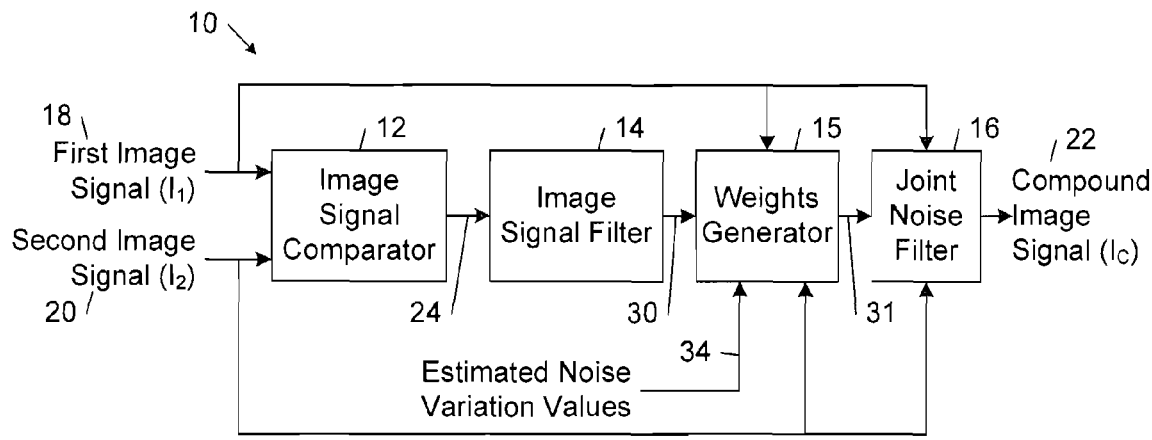
FIG. 1 is a block diagram of an embodiment of an image processing system.

FIG. 1 shows an embodiment of an image processing system 10 that includes an image signal comparator 12, an image signal filter 14, a weights generator 15, and a joint noise filter 16. In operation, the image processing system 10 processes at least a first image signal 18 ($I_1$) and a second image signal 20 ($I_2$) to produce a compound image signal 22.

In some embodiments, the first and second image signals 18, 20 are raw or minimally processed readout signals that are produced by an image sensor (e.g., a CCD image sensor or a CMOS image sensor). The values that are output from the image sensor may be, for example, 8-bit numbers or 12-bit numbers, which have values in a range from 0 (no light) to 255 or 4095 (maximum brightness). In some of these embodiments, the first and second image signals 18, 20 and the compound image signal 22 are in the color filter array domain where the pixel data is arranged in accordance with the spatial arrangement of color filters in the color filter array. For example, in some implementations, the image sensor captures raw Bayer pattern images each of which includes an array of pixels corresponding to colors in a repeating spatial 2×2 pattern in which the upper left pixel is a red pixel, the upper right pixel is a green pixel, the lower left pixel is a green pixel, and the lower right pixel is a blue pixel. In these embodiments, the compound image signal 22 typically is fed into one or more downstream image processing blocks, including a demosaicing block, the process the compound image signal 22 into a compressed or uncompressed output image. The demosaicing block separates different color images from the compound image signal 22.

In other embodiments, the first and second image signals 18, 20 correspond to pixel data obtained from respective image files stored on a machine-readable medium.

As explained in detail below, when the first and second image signals 18, 20 are images of the same scene respectively captured during respective proximate exposure periods (which may be overlapping or nonoverlapping) with different exposure time parameters, the resulting compound image signal 22 typically is higher in sharpness and lower in noise than the constituent first and second image signals 18, 20. In some of these embodiments, prior to being processed by the image processing system 10, the ranges of the pixel values of one or both of the first and second images 18, 20 are scaled in accordance with their respective exposure times. For example, in some implementations, the pixel value range of the one of the first and second image signals 18, 20 having the shorter pixel value range is scaled up by a factor equal to the ratio of the longer exposure time to the shorter exposure time.

Figure 2:
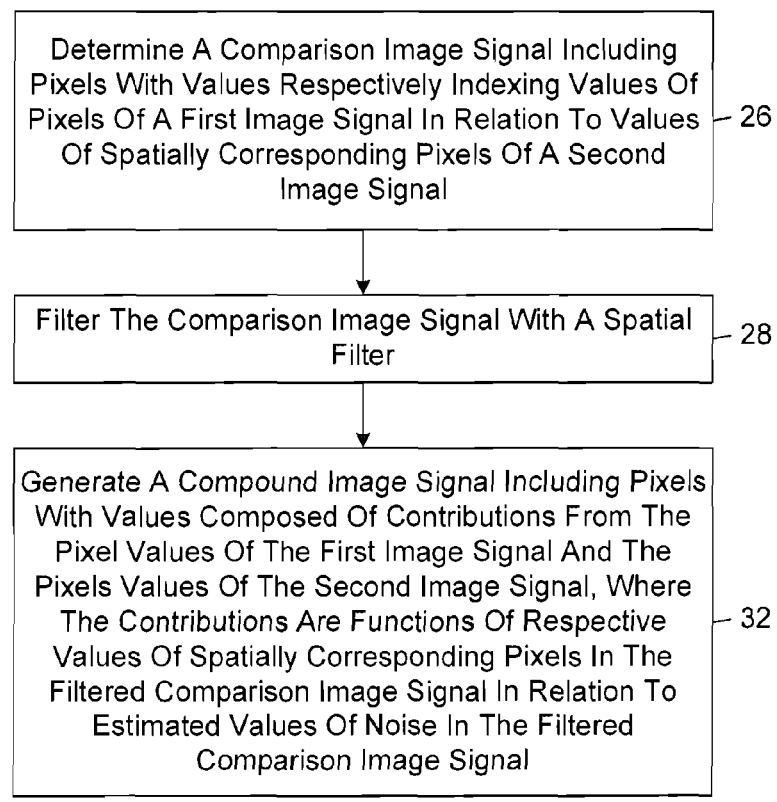
FIG. 2 is a flow diagram of an embodiment of an image processing method.

FIG. 2 shows an embodiment of a method that is implemented by the image processing system 10.

In accordance with the method of FIG. 2, the image signal comparator 12 determines a comparison image signal 24 from the first and second image signals 18, 20 (FIG. 2, block 26). The comparison image signal 24 includes pixels with values respectively indexing values of pixels of the first image signal 18 in relation to values of spatially corresponding pixels of the second image signal 20. As used herein, the "indexing" of a first value in relation to a second value means providing an indication of the amount of the first value in comparison with the second value. For example, in some illustrative embodiments, the difference between the first value and the second value indexes the first value in relation to the second value. In other illustrative embodiments, the ratio of the first value and the second value indexes the first value in relation to the second value. The term "spatially corresponding pixels" refers to pixels of different image signals that correspond to substantially the same spatial regions of the images defined by the image signals. In some implementations, spatially corresponding pixels are pixels from the same pixel locations (e.g., coordinates) within the image frames respectively defined by the different image signals (e.g., the pixel locations in one image signal spatially correspond to the same pixel locations in another image signal). In these implementations, the different image signals typically are captured within a relatively short time range (e.g., on the order of one second, or less). In some implementations, spatially corresponding pixels are pixels that have been determined (e.g., by motion compensation techniques) to correspond to the same location in a scene that is captured in both of the different image signals. The image signal filter 14 filters the comparison image signal with a spatial filter (FIG. 2, block 28). The spatial filter typically is a low-pass filter that spatially denoises the comparison signal 24. The resulting filtered comparison signal 30 increases the separation of noise and signal in the process of generating the compound image signal 22.

The weights generator 15 determines respective weights for the first and second image signals 18, 20. The weights respectively measure values of spatially corresponding pixels in the filtered comparison image signal 30 in relation to estimated values 34 of noise variation in the filtered comparison image signal 30. The weights generator 15 passes the weights 31 to the joint noise filter 16.

The joint noise filter 16 generates the compound image signal 22 based on the first and second image signals 18, 20 and the weights 31 (FIG. 2, block 32). The compound image signal 22 includes pixels with values composed of contributions from the pixel values of the first image signal 18 and the pixel values of the second image signal 20. The pixel value contributions are functions of respective ones of the weights 31.

In some implementations, the first image signal 18 corresponds to an image captured with a first exposure time parameter value and the second image signal 20 corresponds to another image captured with a second exposure time parameter value shorter than the first exposure parameter value. The order in which the first and second images are captured is inconsequential. In these implementations, the first image signal 18 typically has a relatively high signal-to-noise ratio and a relatively high blur level, whereas the second image signal 20 typically has a relatively low signal-to-noise level and a relatively low blur level. Under these circumstances, the values of the pixels in the filtered comparison image signal 30 in relation to the estimated noise variation values 34 provide respective indications of the amounts of blur relative to the amount of noise variation for each of the pixels in the first (long exposure) image 18.

In some embodiments, the weights generator sets the weights 31 such that the relative contributions of the pixel values of the first image signal 18 are higher for relatively low values of the indicated relative amounts of blur and the relative contributions of the pixel values of the first image signal 18 are lower for relatively high values of the indicated relative amounts of blur. Conversely, the weights generator 15 sets the weights 31 such that the relative contributions of the pixel values of the second image signal 20 are lower for relatively low values of the indicated relative amounts of blur and the relative contributions of the pixel values of the second image signal 20 are higher for relatively high values of the indicated relative amounts of blur. In this way, the compound image signal generator 16 averages the relatively low noise characteristics of the first (long exposure) image 18 and the relatively low blur characteristics of the second (short exposure) image 20 to produce the resulting compound image signal 22 with higher sharpness and lower noise than the constituent first and second image signals 18, 20.

III. Exemplary Embodiments of the Image Processing System and its Components

A. Overview

The image processing system 10 typically is implemented by one or more discrete data processing components (or modules) that are not limited to any particular hardware, firmware, or software configuration. For example, in some implementations, the image processing system 10 is embedded in the hardware of any one of a wide variety of electronic apparatus, including desktop and workstation computers, image and video recording and playback devices (e.g., VCRs and DVRs), cable or satellite set-top boxes capable of decoding and playing paid video programming, portable radio and satellite broadcast receivers, and portable telecommunications devices. The image signal comparator 12, the image signal filter 14, the weights generator 15, and the joint noise filter 16 are data processing components that may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of these data processing components 12-16 are combined into a single data processing component. In some embodiments, the respective functionalities of each of one or more of these data processing components 12-16 are performed by a respective set of multiple data processing components.

In some implementations, process instructions (e.g., machine-readable code, such as computer software) for implementing the methods that are executed by the image processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

B. An Exemplary Embodiment of the Image Signal Comparator

Figure 3:
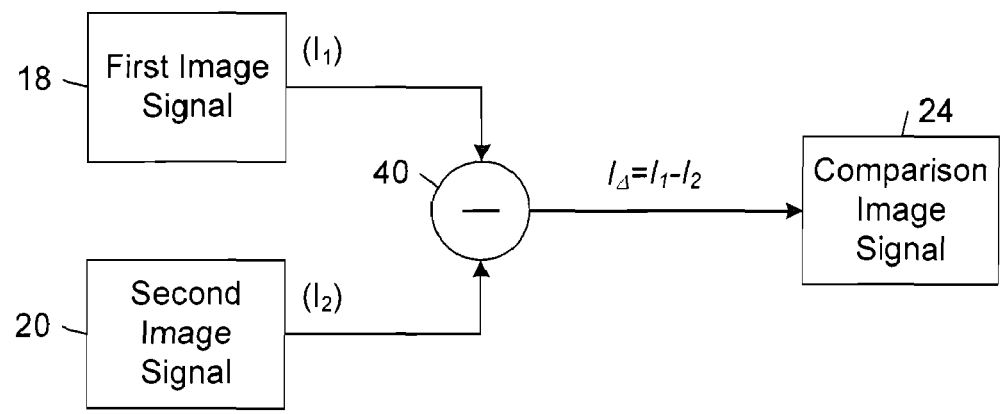
FIG. 3 is a block diagram of an embodiment of an image signal comparator producing a comparison image signal from first and second image signals.

FIG. 3 shows an embodiment 40 of the image signal comparator 12 producing the comparison image signal 24 from the pixel-wise differences between first and second image signals 18, 20 ($I_1$, $I_2$). In this process, the image signal comparator 40 subtracts ones of the pixel values of the second image signal 20 from the values of spatially corresponding ones of the pixels the first image signal 18 to produce the pixel values of the comparison image signal 24. Mathematically, the comparison image signal 24 ($I_\Delta$) produced by the image signal comparator 40 can be expressed as follows:

$$I_\Delta = I_1 - I_2 \qquad (1)$$

C. An Exemplary Embodiment of the Image Signal Filter

Figure 4:
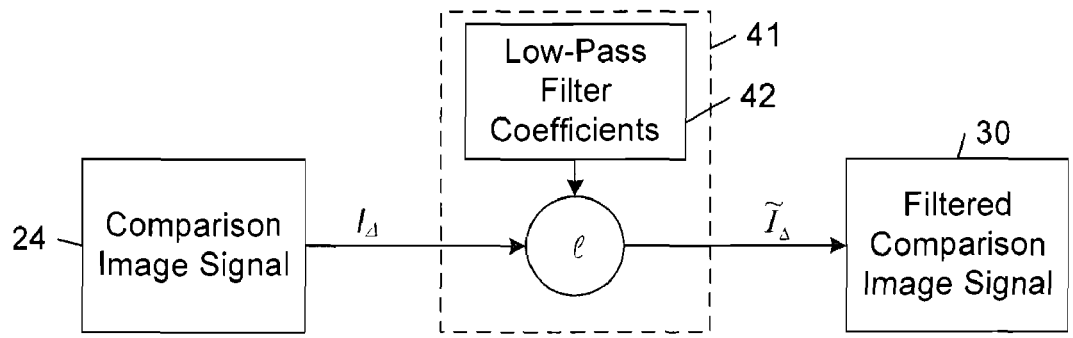
FIG. 4 is a block diagram of an embodiment of an image signal filter producing a filtered comparison image signal from a comparison image signal.

FIG. 4 is a block diagram of an embodiment of an embodiment 41 of the image signal filter 14 producing the filtered comparison image signal 30 ($\tilde{I}_\Delta$) by processing the comparison image signal 24 in accordance with a set of coefficients 42 defining a low-pass filter (l). That is, $$\tilde{I}_\Delta = l \otimes_\Delta \qquad (2)$$

The resulting filtered comparison signal 30 ($\tilde{I}_\Delta$) reduces noise in the comparison image signal 24 and thereby reduces the incidence of noise-induced artifacts in the downstream process of generating the compound image signal 22.

In general, the low-pass spatial filter coefficients 42 may define any type of low-pass spatial filter. In some embodiments, the coefficients 42 define a low-pass filter kernel and the filtered comparison image signal 30 is generated by convolving the comparison image signal 30 with the low-pass filter kernel. In some exemplary embodiments of this type, the low-pass filter kernel is an K×K kernel of a Gaussian low-pass filter, where K has an odd integer value of 3 or greater. In some exemplary embodiments, K has a value of 5 or 7. In other embodiments, the coefficients 42 are recursion coefficients and the filtered comparison image signal 30 is generated by multiplying (or weighting) the comparison image signal 30 with the recursion coefficients.

The values of the coefficients 42 of the low-pass filter typically are scaled based on the spectral sensitivity of the image sensor and color filter that were used to capture the images corresponding to the first and second image signals 18, 20. For example, in some exemplary implementations, the coefficient values that are used to filter a comparison image signal that is derived from pixels representing the blue color channel are smaller (e.g., by a factor of 0.25 or 0.125) than the coefficient values that are used to filter comparison image signals that are derived from the pixels representing the red and green color channels due to the smaller signal swing of the pixel values in the blue channel.

D. An Exemplary Embodiment of the Weights Generator

1. Overview

Figure 5:
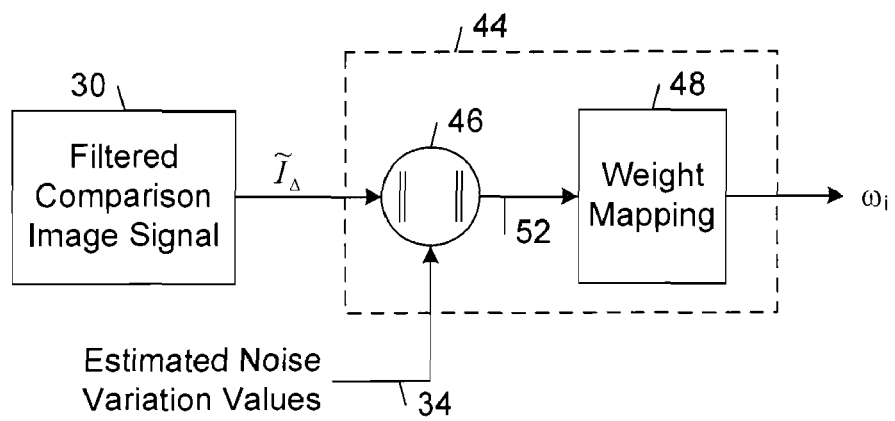
FIG. 5 is a block diagram of an embodiment of a weights generator.

FIG. 5 shows an embodiment 44 of the weights generator 15 that includes a normalization data processing component 46 and a weight mapping component 48. In operation, the normalization data processing component 46 normalizes the filtered comparison image signal 30 (e.g., $\tilde{I}_\Delta$) with respect to the estimated values 34 of noise variation in the filtered comparison image signal. The weight mapping component 48 maps the normalized filtered comparison image signal 30 to respective weights ($\omega_i$) that at least in part determine the contributions of the pixel values of the first and second image signals 18, 20 to the pixel values of the compound image signal 22. The weight mappings implemented by the weight mapping component typically are stored in a lookup table (LUT).

2. Estimating Values of Noise Variation in the Filtered Comparison Image Signal

Figure 6A:
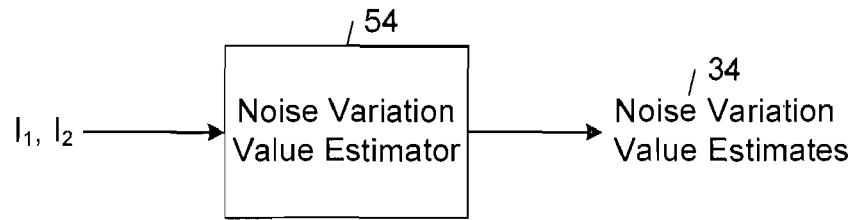
FIG. 6A is a block diagram of an embodiment of a noise variation value estimator producing noise variation value estimates from an image signal.

FIG. 6A shows an embodiment of a noise variation value estimator 54 that produces the noise variation value estimates 34 from the first and second image signals 18, 20. The noise variation value estimates 34 may correspond to any measure that describes the noise variation in the filtered comparison image signal 30. In some embodiments, the noise variation value estimates 34 describe the noise variance at the pixels of the filtered comparison image signal 30. In other embodiments, the noise variation value estimates 34 describe the noise standard deviation at the pixels of the filtered comparison image signal 30.

In some embodiments, the noise variation value estimator 54 estimates the noise variation value estimates 34 directly from the filtered comparison image signal 30 using any of a wide variety of different image processing techniques. For example, in some embodiments, the noise variation value estimates 34 are computed in accordance with one or more of the signal noise estimation methods described in U.S. application Ser. No. 11,388,152, which was filed Mar. 22, 2006.

Figure 6B:
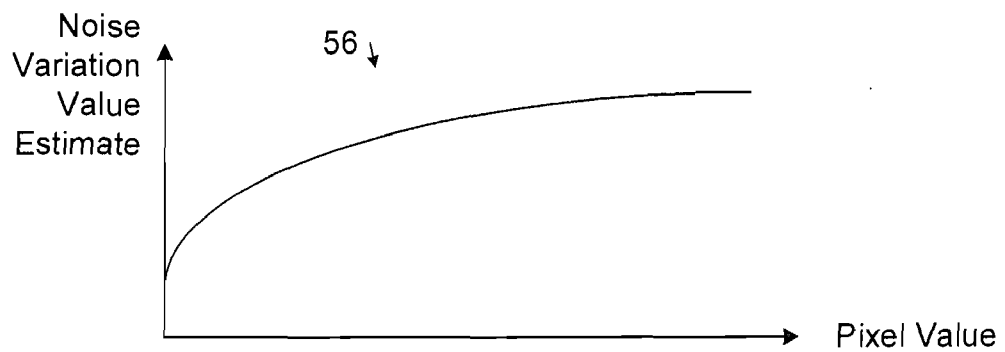
FIG. 6B is a devised graph of noise variation value estimates plotted as a function of pixel value.

In other embodiments, the noise variation value estimator 54 determines the noise variation value estimates 34 based on estimates of noise variation in the first and second images 18, 20. In this process, the noise variation value estimator 54 determines respective noise variation value estimates for the pixels of the first and second images 18, 20 from a noise variation profile of the type shown in FIG. 6B. FIG. 6B shows a devised noise variation profile 56 of noise variation value estimates for the pixels of an image signal plotted as a function of pixel value. The noise variation profile 56 may be determined in a wide variety of different ways. In some embodiments, the noise variation profile 56 is determined from known parameters (e.g., shot noise, readout noise, and non-uniformity parameters) of the image sensor that was used to capture the first and second image signals 18, 20. Before deriving the noise variation value estimates from the noise variation profile 56, the noise variation value estimator 54 typically normalizes the pixel values of one or both of the first and second image signals 18, 20 based on their respective exposure times as explained above.

After estimating the noise variation in the first and second images 18, 20, the noise variation value estimator 54 combines the estimated values of noise variation at spatially corresponding pixels in the first and second image signals 18, 20 to produce estimated values of noise variation in the comparison image signal 24. The noise variation value estimator 54 then filters the estimated values of noise variation in the comparison image signal 30 with a filter that has a low-pass filtering characteristic matching the low-pass filtering characteristic of the image signal filter 14.

In some embodiments, for example, the noise variation value estimates 34 describe the noise variance at the pixels of the filtered comparison image 30. In these embodiments, the noise variation value estimator 54 sums the values of noise variance at spatially corresponding pixels in the first and second image signals 18, 20 to produce estimated values of noise variance in the comparison image signal 24. The noise variation value estimator 54 then filters the estimated values of noise variance in the comparison image signal 24 with a low-pass filter that is defined by a set of coefficients with respective values equal to the squares of the values of corresponding ones of the coefficients of the image signal filter 14.

3. Normalizing the Filtered Comparison Image Signal

Referring back to FIG. 5, the normalization data processing component 46 normalizes the filtered comparison image signal 30 ($\tilde{I}_A$) with respect to the estimated values 34 of noise variation in the filtered comparison image signal 30. The normalization process may be implemented in a wide variety of different ways. For example, in embodiments in which the noise variation value estimates 34 describe the noise variance at the pixels of the filtered comparison image 30, the normalization data processing component 46 squares pixel values of the filtered comparison image signal 30 and divides the squared pixel values by corresponding ones of the estimated values of noise variance in the filtered comparison image signal 30. In embodiments in which the noise variation value estimates 34 describe the noise standard deviation at the pixels of the filtered comparison image 30, the normalization data processing component 46 divides the pixel values of the filtered comparison image signal 30 by corresponding ones of the estimated values of noise standard deviation in the filtered comparison image signal 30.

4. Generating Weights from the Normalized Filtered Comparison Image Signal

The weight mapping component 48 maps the normalized filtered comparison image signal 52 to respective weights ($\omega_i$) that at least in part determine the contributions of the pixel values of the first and second image signals 18, 20 to the pixel values of the compound image signal 22. In general, the weight mapping component 48 may map the normalized filtered comparison image signal 52 to respective weight values ($\omega_i$) in any of a wide variety of different ways. For example, in some embodiments, the weight mapping component 48 implements a thresholding of the normalized filtered comparison image signal 52 using a hard threshold of the type shown in FIG. 7A or a soft threshold of one of the types shown in FIG. 7B.

Figure 7A:
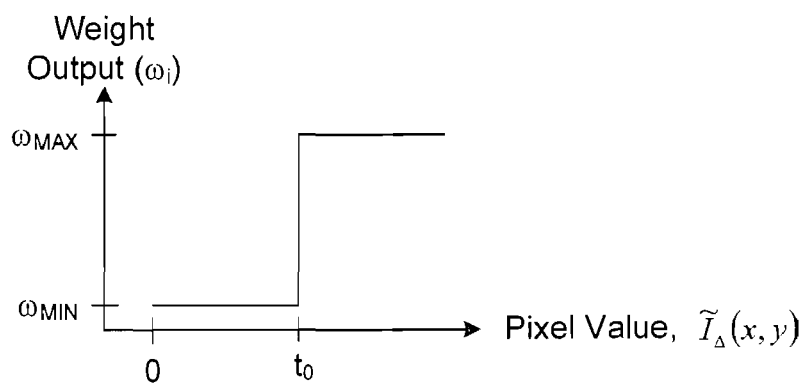
FIG. 7A is a graph of threshold output in an implementation of the compound image signal generator of FIG. 5 plotted as a function of pixel value.

The hard threshold shown in FIG. 7A outputs $\omega_{MAX}$ when a pixel value ($\tilde{I}_A(x,y)$) of the normalized filtered comparison image signal 52 meets a first composition predicate (e.g., one of $\tilde{I}_A(x,y) > t_0$ and $\tilde{I}_A(x,y) \geq t_0$) and outputs $\omega_{MIN}$ when the normalized filtered comparison image signal 52 meets a second composition predicate (e.g., one of $\tilde{I}_A(x,y) \leq t_0$ and $\tilde{I}_A(x,y) < t_0$).

Figure 7B:
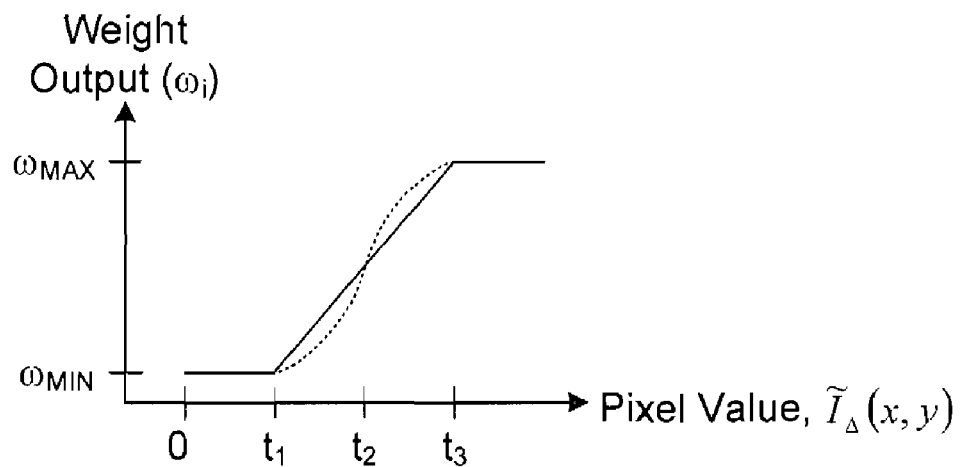
FIG. 7B shows two exemplary graphs of threshold output in respective implementations of the weights generator of FIG. 5 plotted as a function of pixel value.

The soft thresholds shown in FIG. 7B, on the other hand, outputs a range of values from $\omega_{MIN}$ to $\omega_{MAX}$ depending on the values of the pixels of the normalized filtered comparison image signal 52 ($\tilde{I}_A(x,y)$).

In some embodiments, $\omega_{MIN} + \omega_{MAX} = 1$. In some of these embodiments, $\omega_{MIN} = 0$ and $\omega_{MAX} = 1$.

E. An Exemplary Embodiment of the Joint Noise Filter

The joint noise filter 16 determines the values of the pixels of the compound image signal 22 based on contributions from the values of pixels in the first image signal 18 and the values of pixels in the second image signal 20, where the contributions are determined at least in part by the weights ($\omega_i$) produced by the weight mapping component 48.

For the purpose of the following discussion it is assumed that I represents an ideal image of a scene that is free of noise and blur, the first image signal 18 corresponds to a first image captured with a first exposure time parameter value, and the second image signal corresponds to a second image captured with a second exposure time parameter value shorter than the first exposure parameter value. Under these assumptions and further assuming that the image signal comparator produces the comparison image signal 24 ($I_A$) in accordance with equation (1), the first and second images 18 and 20 can be modeled as follows:

$$I_1 = h \otimes I + N_1 \qquad (3)$$

$$I_2 = I + N_2 \qquad (4)$$

where h is the blur kernel, $\otimes$ represents the convolution operation, $N_1$ is the noise in the first image signal 18, and $N_2$ is the noise in the second image signal 20. In accordance with this model, the comparison image signal 24 ($I_A$) is given by:

$$I_A = (h - \delta) \otimes I + (N_1 - N_2) \qquad (5)$$

where $\delta$ is the impulse function. The formulation defined equation (5) shows that the comparison image signal 24 includes a signal component [i.e., $(h-\delta) \otimes I$] and a noise component [i.e., $(N_1 - N_2)$]. The signal component [i.e., $(h-\delta) \otimes I$] shows where the blur has created noticeable deviation between the first (long exposure) image signal 18 and the second (short exposure) image signal 20. The variance of the noise component [i.e., $(N_1 - N_2)$] is the sum of the variances in the first and second image signals 18, 20, which can be determined as described in detail above.

For each pixel, the dominant one of the signal and noise components can be determined by normalizing the comparison image signal 24 with respect to estimates of the noise variation in the comparison image signal 24 as described above. In particular, a relatively high value of the normalized comparison image signal suggests that the blur component is dominant, whereas a relatively low value of the normalized comparison image signal suggests that the noise component dominates. This information is incorporated into the weights generator 15 to at least in part determine the contributions of the pixel values of the first and second images 18, 20 to the values of spatially corresponding pixels of the compound image signal 22.

Figure 8:
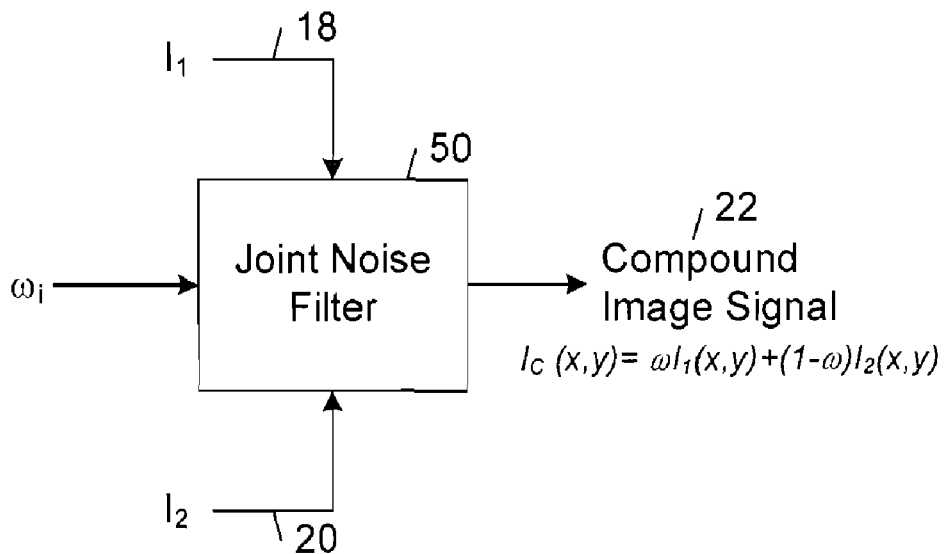
FIG. 8 is a block diagram of an embodiment of a joint noise filter.

FIG. 8 shows an embodiment 50 of the joint noise filter 16 that determines the values of the pixels of the compound image signal 22 based on contributions from the values of pixels in the first image signal 18 and the values of pixels in the second image signal 20, where the contributions are at least in part determined by the weights ($\omega_i$) produced by the weight mapping component 48. In some exemplary embodiments, the pixel values of the compound image signal ($I_C$) are determined in accordance with equation (6):

$$I_C(x, y) = \omega_i(x, y) \cdot I_1(x, y) + (1 - \omega_i(x, y)) \cdot I_2(x, y) \quad (6)$$

where (x, y) denotes the coordinate locations of the pixels in the first, second, and compound image signals 18, 20, 22.

In implementations of the joint noise filter 50 in which the thresholding data processing component 48 uses the hard threshold shown in FIG. 7A, the joint noise filter 50 sets the values of respective ones of the pixels of the compound image signal 22 to the values of spatially corresponding ones of the pixels in the first image signal 18 in response to respective determinations that the values of spatially corresponding pixels of the filtered comparison image signal 30 in relation to the corresponding estimated noise variation values 34 meet the first composition predicate described above. The joint noise filter 50 also sets the values of respective ones of the pixels of the compound image signal 22 to the values of spatially corresponding ones of the pixels in the second image signal 20 in response to respective determinations that the values of spatially corresponding pixels of the filtered comparison image signal 30 in relation to the corresponding estimated noise variation values 34 meet the second composition predicate described above.

The resulting compound image signal 22 typically is processed into a compressed or uncompressed image file and stored in a machine-readable medium. In some embodiments, the compound image signal 22 is spatially filtered (e.g., using a joint spatial filter of the type described in detail below in connection with the embodiment of FIG. 11) before being converted into a compressed or uncompressed image file. As explained above, the compound image signal 22 additionally may be processed by one or more downstream image processing blocks before being converted into a compressed or uncompressed image file. In some embodiments, one or more of the following operations are performed on the compound image signal 22: demosaicing; color correction; image compression; one or more storage operations; and one or more transmission operations.

Figure 9:
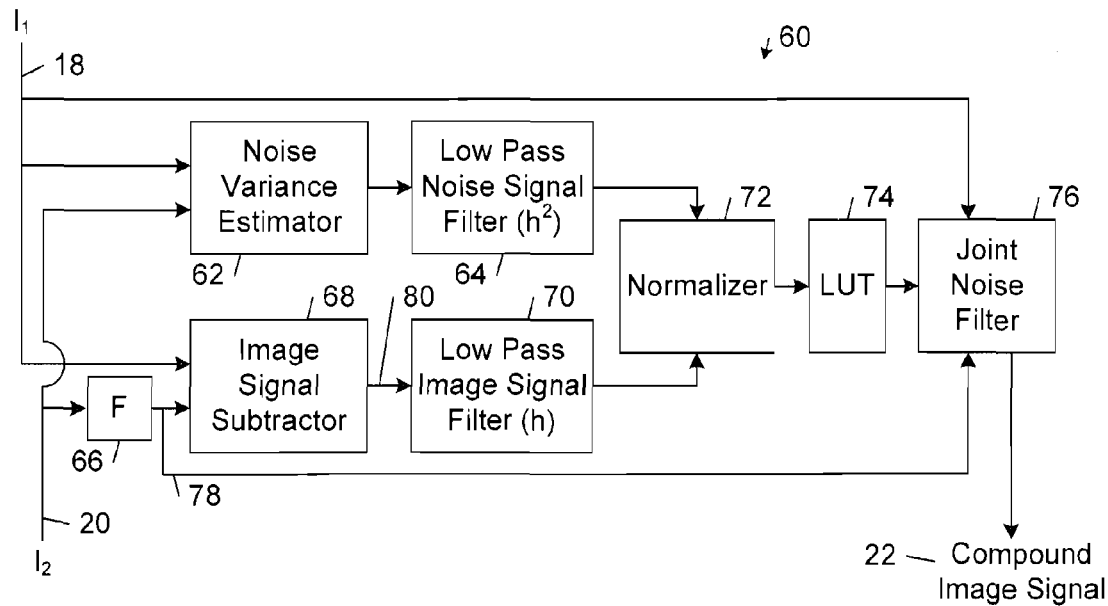
FIG. 9 is a block diagram of an embodiment of the image processing system of FIG. 1.

IV. Exemplary Architectures of the Image Processing System and Associated Application Environments A. A First Exemplary Image Processing System Architecture and Application Environment FIG. 9 shows an embodiment 60 of the image processing system 10 that includes a noise variance estimator 62, a low-pass noise signal filter 64, a noise filter (F) 66, an image signal subtractor 68, a low-pass image signal filter 70, a normalizer 72, a look-up table (LUT) 74, and a joint noise filter 76. In the illustrated embodiment, the first image signal 18 corresponds to an image captured with a first exposure time parameter value and the second image signal 20 corresponds to another image captured with a second exposure time parameter value shorter than the first exposure parameter value.

In one exemplary embodiment, the components of the image processing system 60 are implemented as follows:

The noise variance estimator 62 corresponds to the embodiment of the noise variation value estimator 54 that computes estimates of noise variance for the pixels of the filtered comparison image signal 30, as described above.

The low-pass noise signal filter 64 corresponds to the embodiment of the normalization data processing component 46 that squares pixel values of the filtered comparison image signal 24 and divides the squared pixel values by corresponding ones of the estimated values of noise variance in the filtered comparison image signal 24.

The noise filter 66 may be implemented by any type of noise filter (e.g., a range-filtering bilateral filter or a domain-filtering bilateral filter) that smoothes the second image signal 20 while preserving edges. In this process, the noise filter 66 determines the value of each pixel of the resulting spatially filtered second image signal 78 from a weighted average of the values of the spatially corresponding pixel in the second image signal 20 and its neighbors within a specified spatial window centered over that pixel.

The image signal subtractor 68 determines a difference image signal 80 from the pixel-wise difference between the first image signal 18 and the spatially filtered second image signal 78 in accordance with equation (1) defined above.

The low-pass image signal filter 70 corresponds to one of the embodiments of the image signal filter 14 described above.

The normalizer 72 corresponds to the embodiment of the normalization data processing component 46 that normalizes the filtered comparison image signal 30 ($\tilde{I}_A$) with respect to the estimated values 34 of noise variance in the filtered comparison image signal. In this process, the normalizer 72 squares pixel values of the filtered comparison image signal 24. The normalizer 72 then divides the squared pixel values by corresponding ones of the estimated values of noise variance in the filtered comparison image signal 24 and passes the results to the lookup table 74.

The look-up table (LUT) 74 stores a mapping from the normalized filtered comparison image signal 52 to the values of respective weights ($\omega_i$), which may be generated in accordance with any of the embodiments of the weight mapping component 48 that are described herein.

In general, the joint noise filter 76 may correspond to one of the embodiments of the joint noise filter 16 described herein. In some embodiments designed for applications subject to significant computing or memory resource constraints, the joint noise filter 76 implements the joint noise filter function defined in equation (6).

The image processing system 110 readily may be extended to incorporate into the production of the compound image signal 22 one or more image signals in addition to the first and second image signals 18, 20. In these embodiments, the image signal with shortest exposure time parameter is compared pairwise with each of the other image signals in the manner described above. The resulting comparison signals are used to generate respective weights for each of the image signals in the manner described above. These weights are scaled such that the weights for the shortest exposure time image are all equal. The scaled weights are then normalized such that the sums of all the weights are equal to one at each pixel. A joint noise filter having a respective image signal input and a respective weight input for each image signal is used to combine the constituent image signals based on the respective weights to produce the compound image signal 22 ($I_C$) in a manner analogous to the operation of any of the joint noise filters described above.

Figure 10:
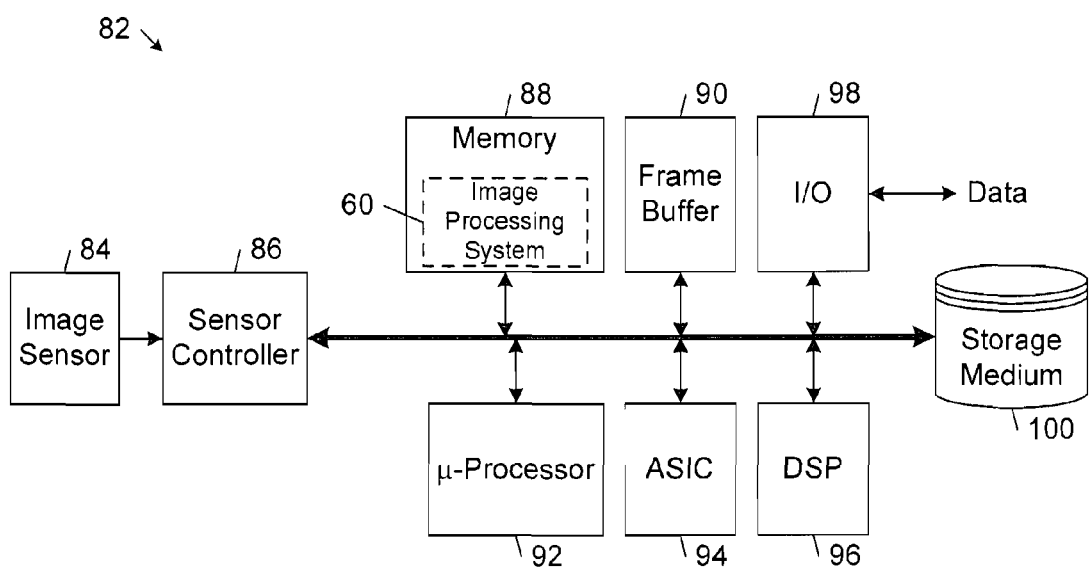
FIG. 10 is a block diagram of an embodiment of a digital camera system that incorporates an embodiment of the image processing system shown in FIG. 9.

FIG. 10 shows an embodiment of a digital camera system 82 that incorporates an embodiment of the image processing system 60. The digital camera system 82 may be configured to capture one or both of still images and video image frames. The digital camera system 82 includes an image sensor 84 (e.g., a charge coupled device (CCD) or a complementary metal-oxide-semiconductor (CMOS) image sensor), a sensor controller 86, a memory 88, a frame buffer 90, a microprocessor 92, an ASIC (application-specific integrated circuit) 94, a DSP (digital signal processor) 96, an I/O (input/output) adapter 98, and a storage medium 100. In general, the image processing system 60 may be implemented by one or more of hardware and firmware components. In the illustrated embodiment, the image processing system 60 is implemented in firmware, which is loaded into memory 88. The storage medium 100 may be implemented by any type of image storage technology, including a compact flash memory card and a digital video tape cassette. The image data stored in the storage medium 100 may be transferred to a storage device (e.g., a hard disk drive, a floppy disk drive, a CD-ROM drive, or a non-volatile data storage device) of an external processing system (e.g., a computer or workstation) via the I/O subsystem 98.

The microprocessor 92 choreographs the operation of the digital camera system 82. In some embodiments, the microprocessor 92 is programmed with a mode of operation in which multiple images are captured within a short period (e.g., on the order of one second or less) with different exposure time parameter values. The captured images and their associated exposure time parameter values are passed to the image processing system 60, which produces the compound image signal 22 from the received data. The microprocessor 92 typically is programmed to perform various operations on the resulting compound image signal 22, including one or more of the following operations: demosaicing; color correction; image compression; one or more storage operations; and one or more transmission operations.

Figure 11:
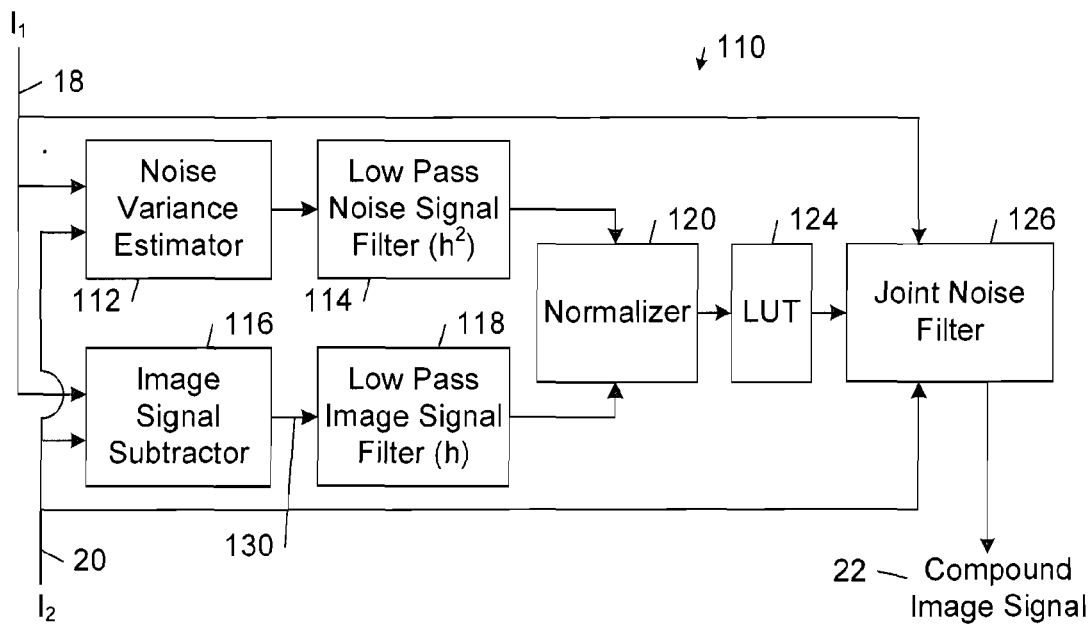
FIG. 11 is a block diagram of an embodiment of the image processing system of FIG. 1.

B. A Second Exemplary Image Processing System Architecture and Application Environment FIG. 11 shows an embodiment 110 of the image processing system 10 that includes a noise variance estimator 112, a low-pass noise signal filter 114, an image signal subtractor 116, a low-pass image signal filter 118, a normalizer 120, a look-up table (LUT) 124, and a joint noise filter 126. In the illustrated embodiment, the first image signal 18 corresponds to an image captured with a first exposure time parameter value and the second image signal 20 corresponds to another image captured with a second exposure time parameter value shorter than the first exposure parameter value.

In one exemplary embodiment, the components of the image processing system 10 are implemented as follows:

The noise variance estimator 112 corresponds to the embodiment of the noise variation value estimator 54 that computes estimates of noise variance for the pixels of the filtered comparison image signal 30, as described above.

The low-pass noise signal filter 114 corresponds to the embodiment of the normalization data processing component 46 that squares pixel values of the filtered comparison image signal 24 and divides the squared pixel values by corresponding ones of the estimated values of noise variance in the filtered comparison image signal 24.

The image signal subtractor 116 determines a difference image signal 130 from the pixel-wise difference between the first image signal 18 and the second image signal 20 in accordance with equation (1) defined above.

The low-pass image signal filter 118 corresponds to one of the embodiments of the image signal filter 14 described above.

The normalizer 120 corresponds to the embodiment of the normalization data processing component 46 that normalizes the filtered comparison image signal 30 ($\tilde{I}_A$) with respect to the estimated values 34 of noise variance in the filtered comparison image signal. In this process, the normalizer 120 squares pixel values of the filtered comparison image signal 24. The normalizer 120 then divides the squared pixel values by corresponding ones of the estimated values of noise variance in the filtered comparison image signal 24 and passes the results to the lookup table 124.

The look-up table (LUT) 124 stores a mapping from the normalized filtered comparison image signal 52 to the values of respective weights ($\omega_i$), which may be generated in accordance with any of the embodiments of the weight mapping component 48 that are described herein.

In general, the joint noise filter 126 may correspond to one of the embodiments of the joint noise filter 16 described herein. In some embodiments, the joint noise filter 76 implements one of the joint noise filter functions defined in detail below.

The joint noise filter 126 implements a joint smoothing function that averages the relatively low noise characteristics of the first (long exposure) image 18 and the relatively low blur characteristics of the second (short exposure) image 20 to produce the resulting compound image signal 22 with higher sharpness and lower noise than the constituent first and second image signals 18, 20.

In some embodiments, the joint noise filter 126 implements the joint smoothing function in two stages. In the first stage, the joint noise filter 126 computes a preliminary compound image signal ($I_{PC}$), which is equal to the weighted combination of the first and second signals 18, 20 defined in equation (6). That is, $$I_{PC}(x, y) = \omega(x, y) \cdot I_1(x, y) + (1-\omega)) \cdot I_2(x, y) \quad (7)$$

In the second stage, the joint noise filter 126 determines the value of each pixel of the compound image signal 22 from a weighted average of the values of the spatially corresponding pixel in preliminary compound image signal ($I_{PC}$) and a set of pixels within respective spatially corresponding neighborhoods in the first image signal 18, the second image signal 20, and the preliminary image signal ($I_{PC}$). In some embodiments, the joint noise filter 126 computes the pixel values of the compound image signal 22 ($I_C$) in accordance with equations (8 and 9):

$$I_C(x, y) = \quad (8)$$
$$\frac{1}{K}\sum_{m,n} \omega(x-m, y-n) \cdot \{I_{PC}(x, y) - I_1(x-m, y-n)\} \cdot h(m, n) \cdot$$
$$I_1(x-m, y-n) + \frac{1}{K}\sum_{m,n}(1-\omega(x-m, y-n)) \cdot g_s \cdot$$
$$\{I_{PC}(x, y) - I_2(x-m, y-n)\} \cdot h(m, n) \cdot I_2(x-m, y-n)$$
where
$$K = \sum_{m,n} \omega(x-m, y-n) \cdot g_1(\{I_{PC}(x, y) - I_1(x-m, y-n)\}) \cdot h(m, n) + \quad (9)$$
$$\sum_{m,n}(1-\omega(x-m, y-n)) \cdot g_2(\{I_{PC}(x, y) - I_2(x-m, y-n)\}) \cdot h(m, n)$$

The parameter $g_1$ is the photometric distance function for first (long exposure) image signal 18 and the parameter $g_2$ is the photometric distance function for the second (short exposure) image signal 20. In this embodiment, the joint noise filter 126 averages ones of the values of the pixels of the preliminary compound image signal with weighted contributions from the values of pixels in spatially corresponding regions of the first and second image signals.

In other ones of these embodiments, the joint noise filter 126 computes the pixel values of the compound image signal 22 ($I_C$) directly in accordance with equations (10 and 11):

$$I_C(x, y) = \quad (10)$$
$$\frac{1}{K}\sum_{m,n} \omega(x-m, y-n) \cdot g_1 \cdot \{I_2(x, y) - I_1(x-m, y-n)\} \cdot h(m, n) \cdot$$
$$I_1(x-m, y-n) + \frac{1}{K}\sum_{m,n}(1-\omega(x-m, y-n)) \cdot g_2 \cdot$$
$$\{I_2(x, y) - I_2(x-m, y-n)\} \cdot h(m, n) \cdot I_2(x-m, y-n)$$
where
$$K = \sum_{m,n} \omega(x-m, y-n) \cdot g_1(\{I_2(x, y) - I_1(x-m, y-n)\}) \cdot h(m, n) + \quad (11)$$
$$\sum_{m,n}(1-\omega(x-m, y-n)) \cdot g_2(\{I_2(x, y) - I_2(x-m, y-n)\}) \cdot h(m, n)$$

As explained above, the parameter $g_1$ is the photometric distance function for first (long exposure) image signal 18 and the parameter $g_2$ is the photometric distance function for the second (short exposure) image signal 20.

The image processing system 110 readily may be extended to incorporate into the production of the compound image signal 22 one or more image signals in addition to the first and second image signals 18, 20. In these embodiments, the image signal with shortest exposure time parameter is compared pairwise with each of the other image signals in the manner described above. The resulting comparison signals are used to generate respective weights for each of the image signals in the manner described above. These weights are scaled such that the weights for the shortest exposure time image are all equal. The scaled weights are then normalized such that the sums of all the weights are equal to one at each pixel. A joint noise filter having a respective image signal input and a respective weight input for each image signal is used to combine the constituent image signals based on the respective weights to produce the compound image signal 22 ($I_C$) in a manner analogous to the operation of any of the joint noise filters described above.

Figure 12:
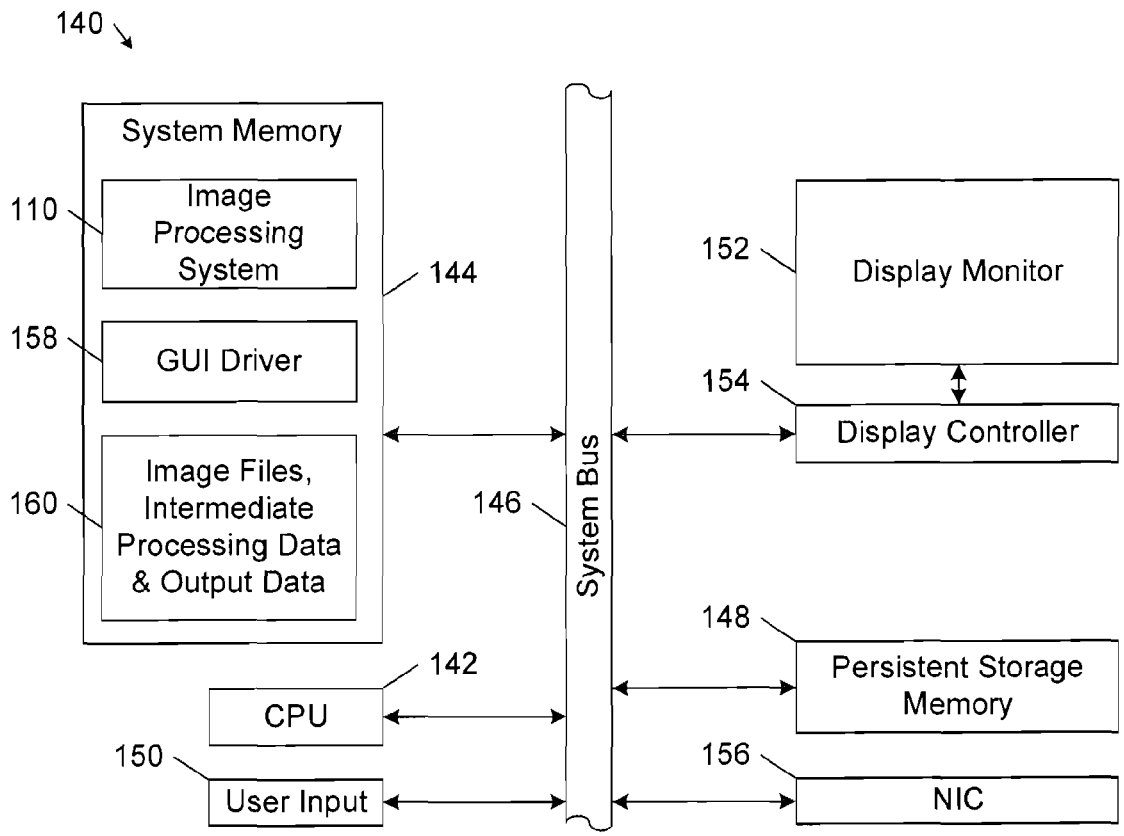
FIG. 12 is a block diagram of an embodiment of a computer system that is programmable to implement an embodiment of the image processing system shown in FIG. 11.

FIG. 12 shows an embodiment of a computer system 140 that incorporates an embodiment of the image processing system 110. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. The computer system 140 also typically includes peripheral output devices, such as speakers and a printer. One or more remote computers may be connected to the computer system 140 through a network interface card (NIC) 156.

As shown in FIG. 12, the system memory 144 also stores an embodiment of the image processing system 110, a GUI driver 158, and a database 160 containing image files corresponding to the first and second image signals 16, 18, intermediate processing data, and output data. In some embodiments, the image processing system 110 interfaces with the GUI driver 158 and the user input 150 to control the creation of the compound image signal 22. In some embodiments, the computer system 140 additionally includes a graphics application program that is configured to render image data on the display monitor 152 and to perform various image processing operations on the compound image signal 22.

V. Conclusion

Among other things, the embodiments that are described herein are capable of processing image signals captured with different exposure time parameters into a compound image signal that is higher in sharpness and lower in noise than the constituent image signals. These embodiments include spatial filtering elements to assist in the generation of the compound image signal in a way that is robust to noise in the shorter exposure image signal. As a result, the compound image signal is less likely to contain artifacts induced by noise and blur.

Other embodiments are within the scope of the claims.

What is claimed is:

1. A method, comprising:
    determining a comparison image signal comprising pixels with values respectively indexing values of pixels of a first image signal in relation to values of spatially corresponding pixels of a second image signal;
    filtering the comparison image signal with a spatial filter; and
    generating a compound image signal comprising pixels with values composed of contributions from the pixel values of the first image signal and the pixel values of the second image signal, wherein the contributions are functions of respective values of spatially corresponding pixels in the filtered comparison image signal in relation to values of noise variation in the filtered comparison image signal;

wherein the determining, the filtering, and the generating are performed by computing hardware.

2. The method of claim 1, wherein the determining comprises subtracting ones of the pixel values of the second image signal from the values of spatially corresponding ones of the pixels of the first image signal to produce respective pixel values of the comparison image signal.

3. The method of claim 1, wherein the filtering comprises convolving the comparison image signal with a kernel of a low-pass spatial filter.

4. The method of claim 1, wherein the generating comprises normalizing the filtered comparison image signal with respect to the values of noise variation in the filtered comparison image signal.

5. The method of claim 4, wherein:
the normalizing comprises squaring pixel values of the filtered comparison image signal and dividing the squared pixel values by values of noise variance in the filtered comparison image signal;
the spatial filter is a first low-pass filter defined by a set of coefficient values; and
the normalizing comprises estimating the values of noise variance in the filtered comparison image signal by determining values of noise variance in the first and second images, summing the determined values of noise variance at spatially corresponding pixels in the first and second image signals to produce estimated values of noise variance in the comparison image signal, and filtering the estimated values of noise variance in the comparison image signal with a second low-pass filter defined by a set of coefficients with respective values equal to the squares of the values of corresponding ones of the coefficients of the first low-pass filter.

6. The method of claim 4, further comprising mapping the normalized filtered comparison image signal to produce weights that at least in part determine the contributions of the pixel values of the first and second image signals to the pixel values of the compound image signal.

7. The method of claim 1, further comprising capturing the first image signal with a first exposure time parameter value, and capturing the second image signal with a second exposure time parameter value shorter than the first exposure parameter value.

8. The method of claim 1, wherein the generating comprises computing the values of respective ones of the pixels of the compound image signal from a weighted combination of the values of spatially corresponding ones of the pixels of the first and second image signals.

9. The method of claim 1, further comprising filtering the second image signal with a noise filter before determining the comparison image signal.

10. The method of claim 1, wherein the generating comprises calculating weighted combinations of the values of pixels in spatially corresponding regions of the first and second image signals to produce the compound image signal.

11. The method of claim 10, wherein the calculating comprises calculating the weighted combinations in accordance with a joint bilateral filter.

12. The method of claim 1, further comprising:
determining a second comparison image signal comprising pixels with values respectively indexing values of pixels of a third image signal in relation to values of spatially corresponding pixels of the second image signal; and filtering the second comparison image signal with a spatial filter;
wherein the generating comprises generating the compound image signal comprising pixels with values composed of contributions from the pixel values of the first image signal, the second image signal, and the third image signal, wherein the contributions are functions of respective values of spatially corresponding pixels in the first and second filtered comparison image signal in relation to corresponding values of noise variation estimated in the first and second filtered comparison image signal.

13. A system, comprising:
a memory storing processor-readable instructions;
a processor coupled to the memory, operable to execute the instructions, and based at least in part on the execution of the instructions operable to perform operations comprising
determining a comparison image signal comprising pixels with values respectively indexing values of pixels of a first image signal in relation to values of spatially corresponding pixels of a second image signal;
filtering the comparison image signal with a spatial filter; and
generating a compound image signal comprising pixels with values composed of contributions from the pixel values of the first image signal and the pixel values of the second image signal, wherein the contributions are functions of respective values of spatially corresponding pixels in the filtered comparison image signal in relation to values of noise variation in the filtered comparison image signal.

14. The system of claim 13, wherein based at least in part on the execution of the instructions, the processor is operable to perform operations further comprising normalizing the filtered comparison image signal with respect to the values of noise variation in the filtered comparison image signal.

15. The system of claim 14, wherein in the normalizing the processing is operable to perform operations comprising squaring pixel values of the filtered comparison image signal and dividing the squared pixel values by estimated values of noise variance in the filtered comparison image signal, and the spatial filter is a first low-pass filter defined by a set of coefficient values;
wherein based at least in part on the execution of the instructions, the processor is operable to perform operations comprising estimating the values of noise variance in the filtered comparison image signal by determining values of noise variance in the first and second images and summing the determined values of noise variance at spatially corresponding pixels in the first and second image signals to produce estimated values of noise variance in the comparison image signal; and
wherein, based at least in part on the execution of the instructions, the processor is operable to perform operations comprising filtering the estimated values of noise variance in the comparison image signal with a second low-pass filter defined by a set of coefficients with respective values equal to the squares of the values of corresponding ones of the coefficients of the first low-pass filter.

16. The system of claim 14, wherein, based at least in part on the execution of the instructions, the processor is operable to perform operations comprising mapping the normalized filtered comparison image signal to produce weights that at least in part determine the contributions of the pixel values of the first and second image signals to the pixel values of the compound image signal.

17. The system of claim 14, wherein based at least in part on the execution of the instructions, the processor is operable to perform operations comprising calculating weighted combinations of the values of pixels in spatially corresponding regions of the first and second image signals to produce the compound image signal.

18. The system of claim 13, wherein, based at least in part on the execution of the instructions, the processor is operable to perform operations comprising:
  determining a second comparison image signal comprising pixels with values respectively indexing values of pixels of a third image signal in relation to values of spatially corresponding pixels of the second image signal;
  filtering the second comparison image signal with a spatial filter; and
  generating the compound image signal comprising pixels with values composed of contributions from the pixel values of the first image signal, the second image signal, and the third image signal, wherein the contributions are functions of respective values of spatially corresponding pixels in the first and second filtered comparison image signal in relation to corresponding values of noise variation estimated in the first and second filtered comparison image signal.

19. The system of claim 13, further comprising an image sensing system operable to capture the first image signal with a first exposure time parameter value and operable to capture the second image signal with a second exposure time parameter value shorter than the first exposure parameter value.

20. A non-transitory machine readable medium storing machine-readable instructions causing a machine to perform operations comprising:
  determining a comparison image signal comprising pixels with values respectively indexing values of pixels of a first image signal in relation to values of spatially corresponding pixels of a second image signal;
  filtering the comparison image signal with a spatial filter; and
  generating a compound image signal comprising pixels with values composed of contributions from the pixel values of the first image signal and the pixel values of the second image signal, wherein the contributions are functions of respective values of spatially corresponding pixels in the filtered comparison image signal in relation to values of noise variation in the filtered comparison image signal.

* * * * *

UNITED STATES PATENT AND TRADEMARK OFFICE
CERTIFICATE OF CORRECTION

PATENT NO.       : 7,925,113 B2                                    Page 1 of 1
APPLICATION NO.  : 11/740976
DATED            : April 12, 2011
INVENTOR(S)      : Suk Hwan Lim It is certified that error appears in the above-identified patent and that said Letters Patent is hereby corrected as shown below:

In column 15, line 4, in Claim 1, delete "filtering." and insert -- filtering, --, therefor.

In column 16, line 35, in Claim 14, delete "wherein" and insert -- wherein, --, therefor.

In column 16, line 47, in Claim 15, delete "wherein" and insert -- wherein, --, therefor.

In column 17, line 4, in Claim 17, delete "wherein" and insert -- wherein, --, therefor.

Signed and Sealed this
Fourth Day of December, 2012

David J. Kappos
*Director of the United States Patent and Trademark Office*